UNITED STATES PATENT OFFICE.

LUKE W. OSBORN, OF MORGAN, AND EDWARD D. MERRIAM AND PETER B. DOTY, OF CONNEAUT, OHIO.

IMPROVEMENT IN THE MANUFACTURE OF ARTIFICIAL STONE.

Specification forming part of Letters Patent No. 164,758, dated June 22, 1875; application filed December 19, 1874.

*To all whom it may concern:*

Be it known that we, LUKE W. OSBORN, of Morgan, Ashtabula county, Ohio, and EDWARD D. MERRIAM and PETER B. DOTY, of Conneaut, Ashtabula county, Ohio, have invented a new and useful Improvement in Manufacture of Artificial Stone, of which the following is a specification:

Our invention consists of an artificial stone composed of sand, resin, sulphur, and coal-tar.

The sand and plaster-of-paris we mix in about the proportions of five to ten pounds of the latter to one bushel of the former, to which we add, when heated to a proper degree for mixing, a cement composed of resin, one hundred pounds; linseed-oil, three pounds; brimstone, half-pound; vulcanized or raw coal-tar, one pint, dissolved together, of which we use about four quarts to one bushel of the sand and plaster, previously heating it about the same as the sand and plaster, mixing all together in a pan or mixing-machine that is kept heated with steam until ready for the forms in which the compound is to be molded into shape, and allowed to harden.

The extent to which the ingredients are heated is judged by the apparent condition, and will be governed by the experience of the operator.

We do not confine ourselves, however, to the use of the plaster-of-paris and the oil, for good hard stone may be produced without them, but the quality is better when they are used; nor do we limit ourselves to the proportions of ingredients stated, as they may be varied within certain limits with good results.

Steam heat will be employed for heating the mixtures, and for maintaining the heat until used, as a more uniform and regular heat may be maintained by it.

Hand or power tamps and pressure are employed, either alone or in combination, for packing the mixture in the molds.

Having thus described our invention, we claim as new and desire to secure by Letters Patent—

The combination of sand, resin, brimstone, and coal-tar, with or without oil and plaster-of-paris, for the manufacture of artificial stone, substantially in the manner herein described.

LUKE W. OSBORN.
    EDWARD D. MERRIAM.
    PETER B. DOTY.

Witnesses for LUKE W. OSBORN:
 F. A. LAUER,
 E. A. WRIGHT.

Witnesses to second and third names:
 LOREN GOULD,
 SYLVANUS F. MATSUN.